United States Patent
Kakegawa

Patent Number: 5,282,035
Date of Patent: Jan. 25, 1994

[54] 1-FIELD MEMORY SYNCHRONIZER AND SYNCHRONIZING METHOD

[75] Inventor: Taketo Kakegawa, Tokyo, Japan

[73] Assignee: Pioneer Electronic Corporation, Tokyo, Japan

[21] Appl. No.: 827,436

[22] Filed: Jan. 29, 1992

[30] Foreign Application Priority Data

Jan. 31, 1991 [JP] Japan ................................. 3-011319

[51] Int. Cl.$^5$ ................................ H04N 5/04
[52] U.S. Cl. ................... 358/148; 358/149; 358/19; 358/17
[58] Field of Search ............... 358/17, 148, 152, 153, 358/19, 149, 320, 339; 360/36.2; H04N 5/262, 5/04

[56] References Cited

U.S. PATENT DOCUMENTS

| | | | |
|---|---|---|---|
| 3,860,952 | 1/1975 | Tallent | 358/19 |
| 4,018,990 | 4/1977 | Long | 358/149 |
| 4,673,980 | 6/1987 | Murakami | 358/149 |
| 4,688,081 | 8/1987 | Furuhata | 358/19 |
| 4,689,676 | 8/1987 | Nakajima | 358/149 |
| 4,751,588 | 6/1988 | Tsujimura | 358/342 |
| 4,797,743 | 1/1989 | Miyazaki | 358/149 |

FOREIGN PATENT DOCUMENTS 2-228888 9/1990 Japan .

*Primary Examiner*—Victor R. Kostak
*Assistant Examiner*—Sherrie Hsia
*Attorney, Agent, or Firm*—Kane, Dalsimer, Sullivan, Kurucz, Levy, Eisele and Richard

[57] ABSTRACT

A synchronizer has a 1-field memory and a reset signal generator. The reset signal generator receives a write sync. signal to control the 1-field memory and outputs a write reset signal which adjusts the timing for writing according to a read sync. signal. An image signal written into the 1-field memory in accordance with the timing determined by the write reset signal is thus synchronized with the timing for reading.

9 Claims, 5 Drawing Sheets

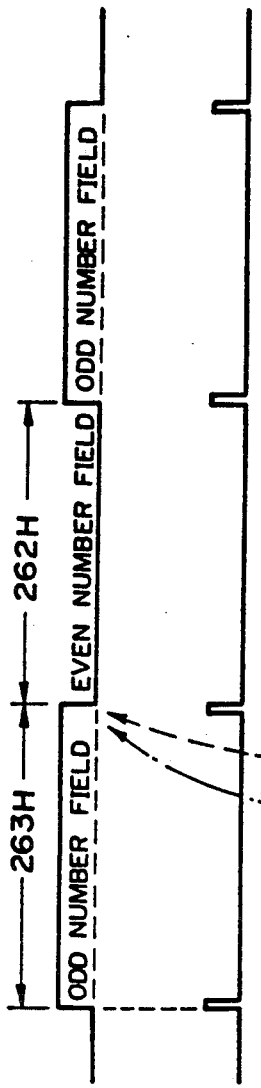
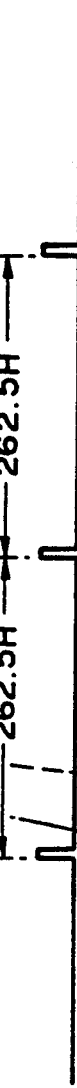

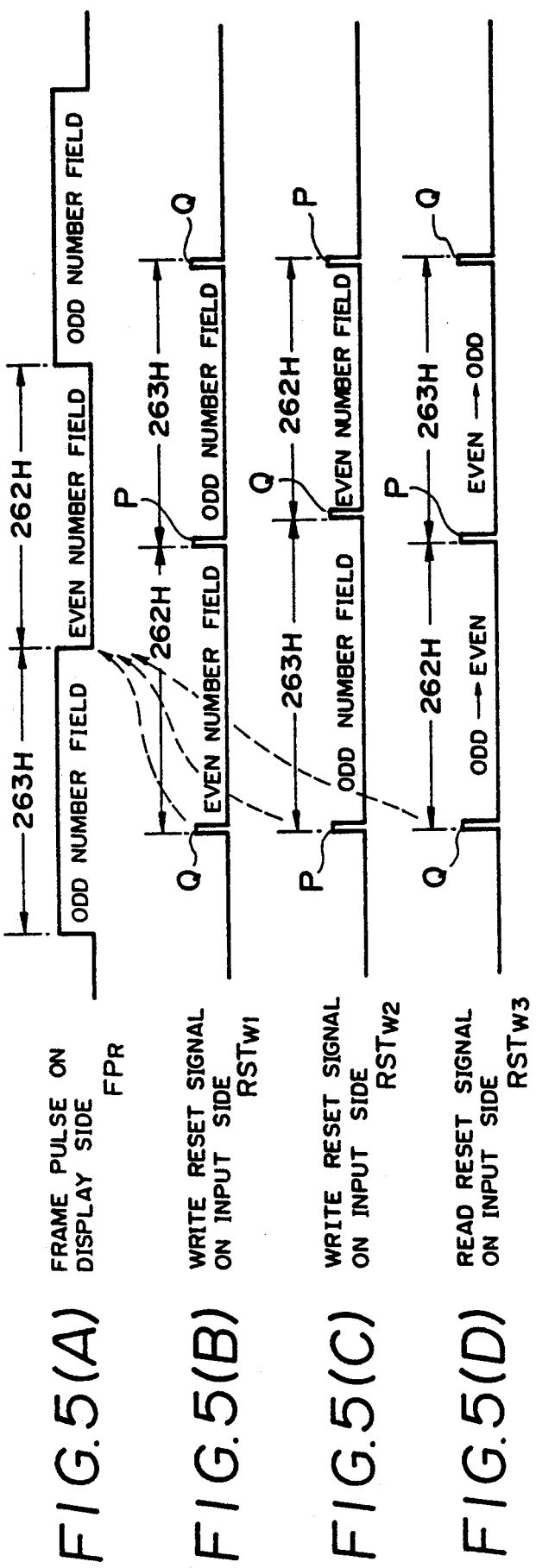

1-FIELD MEMORY SYNCHRONIZER AND SYNCHRONIZING METHOD

BACKGROUND OF THE INVENTION

This invention relates to a synchronizer and a synchronizing method for matching a sync. signal in an input image signal input to a 1-field memory to a reference sync. signal.

Conventionally, there have been two types of synchronizers, one of which is a synchronizer based on a 2-field memory system wherein input image signals are sequentially stored and then output two fields (1 frame) by two fields, the other of which is a synchronizer based on a 1-field memory system wherein image signals are sequentially stored to be output one field by one field. In the synchronizer of the aforesaid 1-field system, sometimes parity of an input side of a 1-field memory may be different from that of an output side (display side) thereof, due to accumulated lag in synchronism between input and output on the basis of aborting or repeatedly reading a specified field of the input image signal. In other words, inversion of scanning lines generated between the input image signals and the output image signals is prevented by delaying a field having become an odd number field anew by 1H (horizontal scanning period) when data from the 1-field memory is read. If inversion occurs, scanning lines of even fields in input image signals and those of odd fields therein are displayed upside down to lose continuity of an original picture. This is very inconvenient. This is due to a NTSC (National Television System Committee) system wherein 1 frame consisting of an odd number of scanning lines (525 lines) is displayed as 2 fields by means of interlace scanning.

A synchronizer of the 1-field memory system detects parity of each field in an input image signal and displays an image signal read from a 1-field memory by 1H (horizontal scan period) according to a result of this detection to prevent inversion of the scanning lines.

That is, as shown in FIG. 1, the conventional synchronizer using a 1-field memory writes an input image signal $S_0$ into the 1-field memory 1 according to a write reset signal $RST_W$ and a system clock $4fsc1$ having a frequency of 4 times of a color sub-carrier on the input side, and outputs the written image signal via a parity determination circuit 3 according to a read reset signal $RST_R$ and a system clock $4fsc2$ on the output side.

Herein, parity of each field in the input image signal from the aforesaid parity determination circuit 3 is checked, and if parity of a field on the input side does not coincide with that on the output side, the image signal is output through a 1H delay circuit according to a result of this checking.

Thus, in a conventional synchronizer, it is necessary to check whether an odd number field or an even number field of an input image signal should be written, and whether a result of this checking coincide with parity of a field of output signal or not, so that a very complicated system is required to do various types of detection.

In the case of a synchronizer of the 2-field memory system, a required memory capacity is very large, and the price is very expensive. Also in the case of a synchronizer of the 1-field memory system, parity of each field in an input image signal must be checked, so that the system becomes very complicated, and furthermore it is necessary to arrange a parity checking circuit to check coincidence between a result of this detection and parity of each field on the output side (display side).

SUMMARY OF THE INVENTION

This invention was made to solve the aforesaid problems, and its object is to provide a synchronizer which can prevent inversion of scanning lines caused by difference of parity of each field in each image signal with a simple configuration.

To achieve the object, a synchronizer comprising: a 1-field memory into which an input image signal is written according to a write sync. signal and from which said input image signal is read according to a read sync. signal which is asynchronous to with said write sync. signal and indicates a start point of each field in an output signal; a reset signal generating means for adjusting a timing for writing a write sync. signal according to said read sync. signal to output a write reset signal, said input image signal being written into said 1-field memory at the timing for writing, determined by said write reset signal thereby to adjust inversion of scanning lines due to difference of parity of each field of said input and output image signals.

BRIEF DESCRIPTION OF THE DRAWINGS

FIGS. 4(A)–4(G) are timing charts for operations of the embodiment of this invention.
FIGS. 5(A)–5(D) are timing charts for general operations as basis for this invention.

DETAILED DESCRIPTION OF THE PREFERRED EMBODIMENTS

Figure 2:
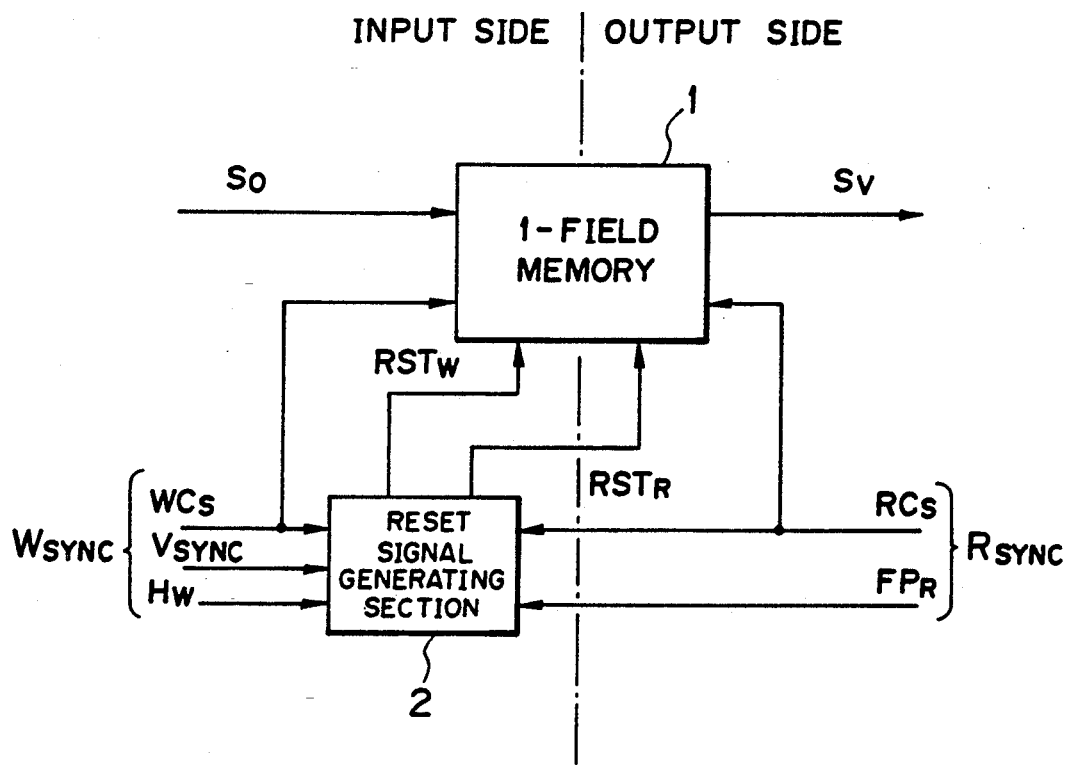
FIG. 2 shows a principle of this invention.
Figure 3:
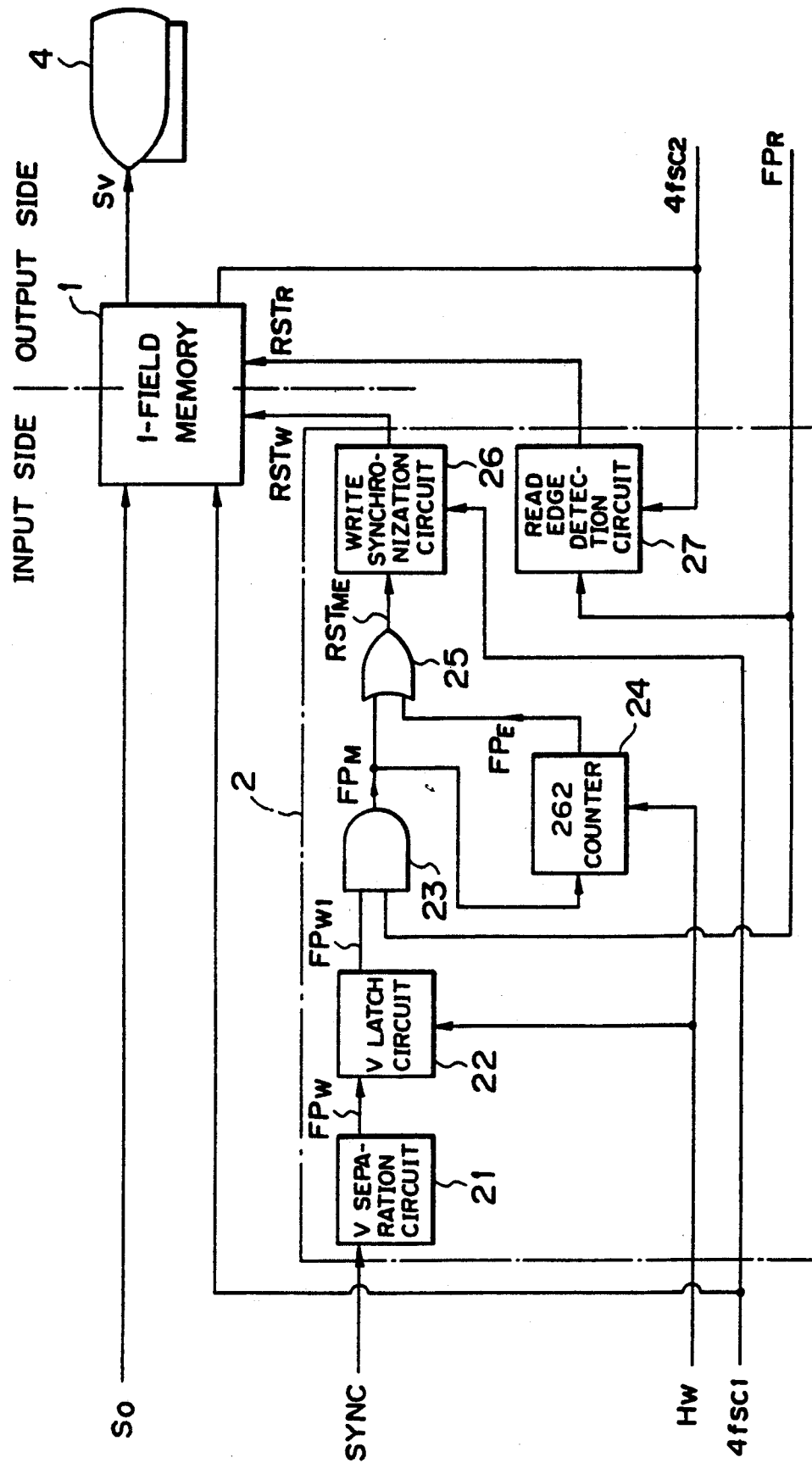
FIG. 3 is a detailed block diagram of an embodiment of this invention.

Description is made for an embodiment of this invention with reference to FIG. 2.

In a synchronizer according to this invention, an input image signal $S_0$ is written in a 1-field memory 1 that stores only 1 field of an image signal according to a write sync. signal $W_{SYNC}$. The image signal stored in the aforesaid 1-field memory 1 is read according to a read sync. signal $R_{SYNC}$ containing a signal that is asynchronous to the write sync. signal $W_{SYNC}$ and indicates a start point of each field in an output image signal $S_V$. Inversion of a scanning line due to difference of parity of a field between the aforesaid input image signal $S_0$ and the read output image signal $S_V$ is adjusted. The synchronizer has a reset signal generating means 2 which adjusts a timing for writing the write sync. signal $W_{SYNC}$ according to the aforesaid read sync. signal $R_{SYNC}$ to output the write reset signal $RST_W$. The input image signal is written into the aforesaid 1-field memory 1 according to a timing determined by the write reset signal $RST_W$. The write sync. signal $W_{SYNC}$ comprises a write clock signal $WC_S$, a vertical sync. signal $V_{SYNC}$ and a horizontal oscillation signal $H_W$. The read sync. signal comprises a read clock signal $RC_S$ and a frame pulse $FP_R$.

The input image signal $S_0$ is written into the 1-field memory in correspondence with a field when the image signal is read from the memory. Thus, inversion of a scanning line between the input side and the output side is prevented by a system having a simple configuration.

Description is made below for a concrete embodiment of this invention with reference to FIG. 3 and FIGS. 4(A)–4(G).

A synchronizer in this concrete embodiment has a 1-field memory 1 which stores 1 field of an input image and a reset signal generating section 2 which generates a reset signal $RST_W$ for controlling writing image signals into and reading them out of the 1-field memory 1.

Figure 1:
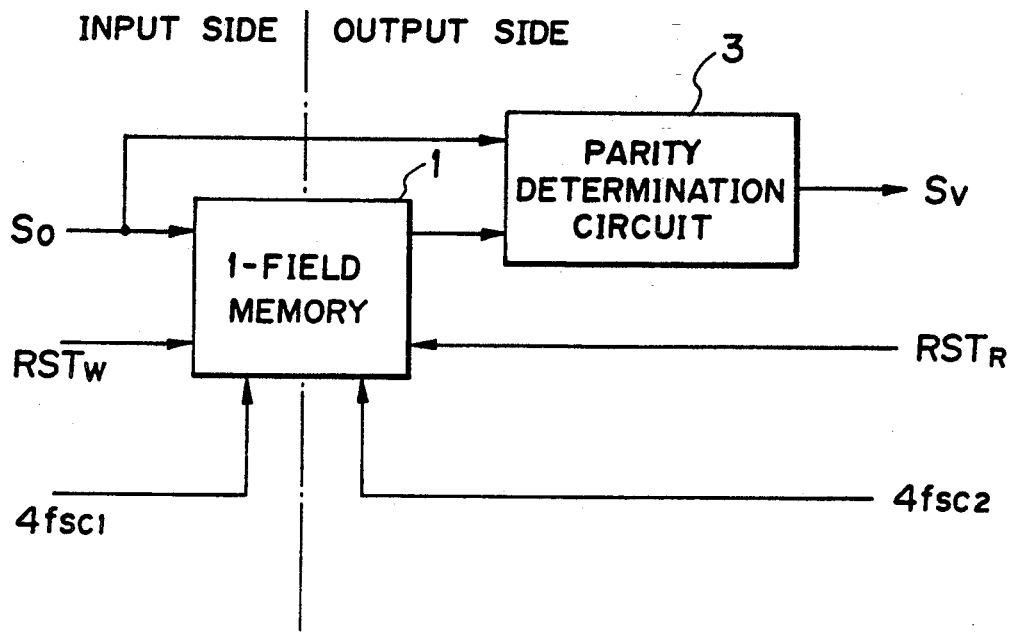
FIG. 1 shows a general configuration of a conventional synchronizer using a 1-field memory.

The 1-field memory 1 has the same configuration as that shown in FIG. 1. An input image signal $S_0$ is written according to a write reset signal $RST_W$ for specifying a start point (origin) of an image for the signal $S_0$ and a system clock 4$fsc$1. A written image signal is read as a display image signal $S_V$ according to a read reset signal $RST_R$ for specifying a start point of an image on a display side and a system clock 4$fsc$2. The display image signal $S_V$ thus read out is output to a display device 4.

The reset signal generating section 2 has a V-separating circuit 21 which separates a vertical sync. signal $V_{SYNC}$ from a sync. signal SYNC for image synchronism of the input image signal $S_0$ to form a field pulse $FP_W$ with an interval of 262.5H (horizontal scanning lines), as shown in FIG. 4(C). A V-latch circuit 22 which holds the field pulse $FP_W$ $$\text{(duty ratio} = 262.5:262.5 = \frac{2n + (2n + 1)}{2} : \frac{2n + (2n + 1)}{2}$$

wherein n is an integral number) obtained, on the basis of the separated vertical sync. signal $V_{SYNC}$, according to a horizontal oscillation frequency signal $H_W$ on an input side to convert the field pulse $FP_W$ into a conversion field pulse $FP_{W1}$ with a duty ratio of 263:262 (or 262:263=2n:2n+1 wherein n is an integral number), (FIG. 4(D)) and with a start point pulse P for an odd number field and a start point pulse Q for an even number field, an AND circuit 23 which computes a logical product condition of the conversion field pulse $FP_{W1}$ with a duty ratio of 263:262 and a frame pulse $FP_R$ (FIG. 4(A)) which takes 1 in an odd number field within an display image signal $S_V$ on the display side and which takes 0 in an even number field to output a masked signal $FP_M$ (FIG. 4(E)) in which the even number field start point pulse Q is erased, a 262 counter 24 which is reset by the masked signal $FP_M$, and counts the horizontal oscillation frequency signal $H_W$ of the input image signal $S_0$ to output an odd number field start point signal $FP_E$ (FIG. 4(F)) with an odd number start point pulse P which is formed at a position separated, by 262H, from the odd number field start point pulse P in FIG. 4(E), an OR circuit which computes a logical sum condition for the odd number frame start point signal $FP_E$ and the masked signal $FP_M$ to output a preliminary write reset signal $RST_{ME}$ (FIG. 4(G)), a write synchronization circuit 26 which synchronizes the write reset signal $RST_{ME}$ with the system clock 4$fsc$1 on the input side to output the write reset signal $RST_W$ to the 1-field memory 1, and a read edge detect circuit 27 which maintains a timing of a system clock 4$fsc$2 on the display side to detect each edge of the fields of the frame pulse $FP_R$ (FIG. 4(A)) in the display image signal $S_V$ thereby to output a read reset signal $RST_R$ (FIG. 4(B)) to the 1-field memory 1.

Then, description is made for operations of the synchronizer based on the configuration in this embodiment with reference to FIGS. 4(A)–4(G) and FIGS. 5(A)–5(D).

FIGS. 5(A)–5(D) show basic timing charts for a general synchronizer. At first, when the frame pulse $FP_W$ (not shown) with a duty ratio of 263:262 is input from the input side, a write reset signal $RST_{W1}$ (FIG. 5(B)) on the input side is obtained by detecting edges of the frame pulse $FP_W$.

Herein, when correlation in terms of time between the input side and the output (display) side is determined as a frame pulse $FR_R$ on the display side as shown in FIG. 5(A), the input image signal $S_0$ is written in the 1-field memory according to the write reset signal $RST_{W1}$ in the order of from an even number field (262H) to an odd number field (263H) as shown in FIG. 5(B). The written signal $S_0$ is then read out therefrom in such a manner that even and odd number fields are read out immediately after even and odd number write start point pulses Q and P, respectively. Therefore, parity of the input side is always the same as that of the display side and "inversion of a field" does not occur. However, if a write reset signal $RST_{W2}$ (FIG. 5(C)), is output to the memory 1 so that the signal $S_0$ is written therein and then read out from the 1-field memory in the order of from an odd number field (263H) to an even number field (262H), the parity of the input side is different from that of the output side. That is, the odd number field start point pulse P does not correspond to the even number field in the frame pulse $FP_R$ as a field immediately after the pulse P. Therefore, "inversion of a field" occurs. In order to prevent the "inversion of a field", two horizontal scanning periods for an odd field (263H) and an even field (262H) are exchanged for each other to output a read reset signal $RST_{W3}$ (FIG. 5(D)).

Next, description is made for a concrete operation performed to prevent "inversion of a field" in the aforesaid embodiment of this invention.

At first, let us assume that the frame pulse $FP_R$ on the display side is, as shown in FIG. 4(A), displayed in the field order of an odd number field, an even number field, and then an odd number field. The read edge detection circuit 27 outputs a read reset signal ($RST_R$) in which each pulse is formed at each edge of the frame pulse $FP_R$. In this step, the sync., signal SYNC of the input image signal $S_0$ is input into the vertical separation circuit 21, and, in this vertical separation circuit 21, the vertical sync. signal $V_{SYNC}$ is separated therefrom and output as a field pulse $FP_W$ (with a duty ratio of 262.5:262.5) on the input side (refer to FIG. 4(C)).

A logical product for the conversion field pulse $FP_{W1}$ formed by the V-latch circuit 22 (FIG. 4(D)) and the frame pulse $FP_R$ on the display side is computed by the AND circuit 23 in order to mask the pulse Q located at an even number field in the frame pulse $FP_R$ on the display side, and at the same time an odd number field start point pulse P located at an odd number field in the frame pulse $FP_R$ is output, thus the mask signal $FP_M$ being output (refer to FIG. 4(E)).

Also the mask signal $FP_M$ is input as a reset signal to the 262 counter 24. The 262 counter 24 counts only the 262H from the horizontal oscillation frequency signal $H_W$ to output an odd number field start point signal $FP_E$ which determines a start point for the next odd number field to be written into the memory 1 (refer to FIG. 4(F)).

A logical sum for the mask signal $FP_M$ and the odd number field start point signal $FP_E$ is computed by the OR circuit 25, and the preliminary write reset signal $RST_{ME}$ is output (refer to FIG. 4(G)). This write reset signal $RST_{ME}$ is synchronized with the system clock 4fsc1 on the input side in the write synchronization circuit 26 and output to the 1-field memory 1. The input image signal $S_0$ is sequentially written in the 1-field memory 1 one field by one field according to the write reset signal $RST_W$.

Furthermore, the image signal written according to the write reset signal $RST_W$ is read according to the read reset signal $RST_R$ which is detected as a start point to read an edge of the frame pulse $FP_R$ on the display side by the read edge detection circuit 27 and which is synchronized according to the system clock 4fsc2. Then, the image signal is output as the display image signal $S_V$ to a display device 4 (not shown).

Figure 6:
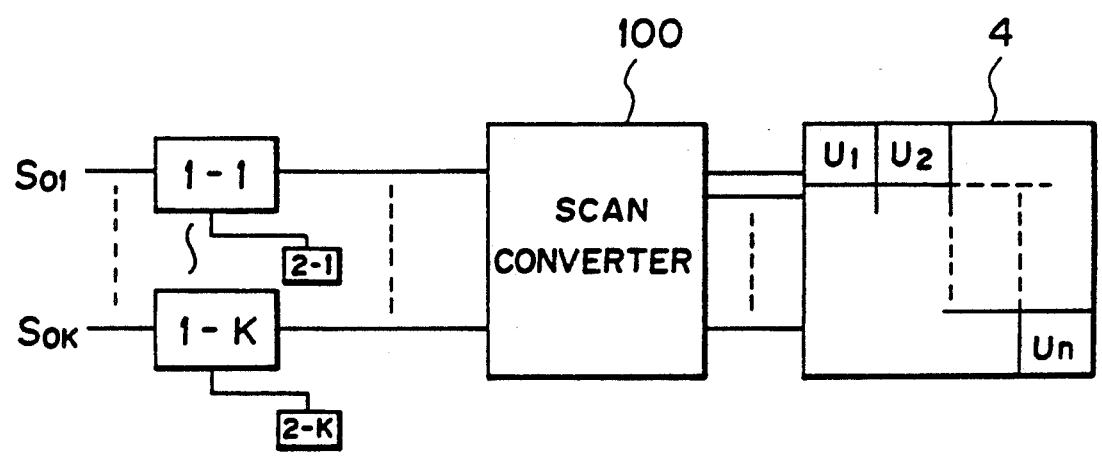
FIG. 6 shows a block diagram showing a general configuration of another embodiment of this invention.

As shown in FIG. 6, when displaying a plurality of image signals $S_{01}$, $S_{02}$, ... $S_{0k}$ are displayed on the display device 4 comprising a plurality of display units U1, U2, ... $U_n$, each of the plurality of image signals $S_{01}$, $S_{02}$... $S_{0k}$ can be read from each of field memories 1-1, ... 1-k corresponding to each image signal at a common timing. The field memories 1-1, ... 1-k have reset signal generating sections 2-1, ... 2-k. Each image signal is distributed or enlarged by a scan converter 100 as a distributor for a signal to the display device 4 in accordance with various display formats. Thus, when this invention is applied to a multi-image display device comprising a plurality of display units U1, U2, ... Un, a timing for reading the image signals from the 1-field memory in a plurality of input sources can be unified, thus errors in read timing on the output side (display side) being eliminated.

The synchronizer according to this invention can also be applied to, in addition to the NTSC system, a SECAM (Sequential Coulours A Memoir) system, and a PAL (Phase Alternation by Line) system.

What is claimed is:

1. A synchronizer comprising:
   a 1-field memory into which an input image signal is inputted under timing of a write sync. signal and from which said input image signal is read out as an output image signal according to a read sync. signal which is asynchronous with said write sync. signal and indicates a start point of each field in the output image signal; and
   a reset signal generating means to which said read sync. signal and said write sync. signal are inputted, for adjusting a timing of said write sync. signal according to said read sync. signal to output a write reset signal to said 1-field memory,
   said input image signal being written into said 1-field memory at a timing for writing, determined by said write reset signal thereby to adjust inversion of scanning lines due to difference of parity of each field of said input and output image signals.

2. A synchronizer of claim 1, wherein the write sync signal comprises a write clock signal, a vertical sync. signal and a horizontal oscillation frequency signal and the read sync signal comprises a read clock signal and a frame pulse.

3. A synchronizer of claim 1, wherein the reset signal generating means comprises a masked signal forming means for masking a field pulse, on an input side located in a field corresponding to 0 of a frame pulse on a display side, a field start point forming means for forming a field start point pulse for a field corresponding to 1 of the frame pulse on the display side by counting a period of the field of 0 of the frame pulse, and a combining means for combine a masked signal generated by the masked signal forming means and a field start point signal generated by the field start point forming means to produce a preliminary write reset signal.

4. A synchronizer of claim 3, wherein the masked signal forming means comprises an AND circuit for obtaining a logical multiplication of a conversion field pulse signal generated by converting a field pulse signal with pulses having a duty ratio of $$\frac{2n+(2n+1)}{2} : \frac{2n(2n+1)}{2},$$

wherein n is an integral number, in number of horizontal scanning lines into a field pulse signal with pulses having a duty ratio of 2n+1:2n, wherein n is an integral number, in number of horizontal scanning lines, the field start point forming means comprises a counter for counting, on the basis of the mask signal, a period corresponding to that of the field of 0 of the frame pulse on the display side, and the combining means comprises an OR circuit for obtaining a logical sum of the mask signal and the field start point signal.

5. A synchronizer of claim 3, further comprising a V separation circuit for separating a vertical sync. signal from the write sync. signal to convert it into a conversion field pulse signal with pulses having a duty ratio of 2n+1:2n, wherein n is an integral number, in number of horizontal scanning lines, a write synchronization circuit for synchronizing the preliminary write reset signal to produce a write reset signal and a read edge detection circuit for detecting edges of the frame pulse on the display side to produce a read reset signal according to a read clock signal.

6. The synchronizer of claim 1, further comprising a display means having a plurality of display units arranged neighboring to each other.

7. A synchronizing method of synchronizing writing of an input image signal into a 1-field memory with reading of an output image signal from the 1-field memory, which comprises the steps of:
   inputting the input image signal into the 1-field memory at a timing of a write sync. signal;
   adjusting a timing of the write sync. signal in accordance with a read sync. signal, which is asynchronous with the write sync. signal and indicates a start point of each field in the output image signal, to output a write reset signal to the 1-field memory;
   writing the input image signal into the 1-field memory at a timing for writing, determined by the write reset signal; and
   reading out the input image signal from the 1-field memory as the output image signal according to the read sync. signal.

8. A synchronizing method of claim of claim 7, wherein a field on input side which is written into the 1-field memory is determined according to kind of field, on output side, which is first read.

9. A synchronizing method of claim of claim 8, wherein in case that a field which is first read out is an even field, a reading is performed on the basis of a vertical sync. signal and in the case that a field which is first read out is an odd field, a reading is performed on the basis of a timing which is separated by a horizontal scanning period corresponding to an even field from the vertical sync. signal.

* * * * *